United States Patent Office 3,232,926
Patented Feb. 1, 1966

3,232,926
5,5'-METHYLENE-BIS(HALOPYRIMIDINE) DYESTUFFS
David Irwin Randall, New Vernon, and Wilhelm Schmidt-Nickels, Little York, N.J., assignors to General Aniline & Film Corporation, New York, N.Y., a corporation of Delaware
No Drawing. Filed Dec. 31, 1962, Ser. No. 248,245
6 Claims. (Cl. 260—154)

This invention relates to a novel fiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision of such processes, compounds, and colored products, which will not be subject to one or more of the above disadvantages and which depend upon a reaction between the chromophoric compound and the fibers. Other objects and advantages will appear as the description proceeds.

The attainment of the above objects is made possible by this invention which is based upon the discovery that colored fibers wih improved properties can be obtained by treating fibers containiing a reactive hydrogen atom in the presence of an acid binding agent with an organic dyestuff containing a radical having the formula (I)

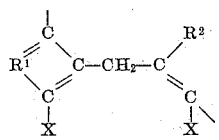

wherein R¹ is selected from the group consisting of radicals of the formulae

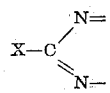

and

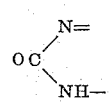

R₂ is selected from the group consisting of radicals of the formulae

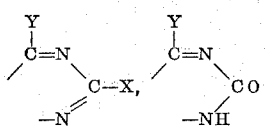

and

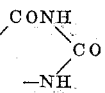

Y is selected from the group consisting of X and an organic dyestuff molecule, and X is selected from the group consisting of Cl and Br.

The fiber-reactive radical shown in the above Formula I has been found to be unexpectedly effective in enabling reaction of chromophoric compounds (including dyestuffs per se) containing the same with fibers containing a reactive hydrogen atom in the fiber molecule with liberation of RX and the production of colored fibers with improved properties with respect to fastness to such deteriorating influences as wet treatments, alkaline and acid conditions, laundry sours, chlorine, and/or light and the like. The present invention accordingly not only resides in the provision of the foregoing process and the colored fibers resulting therefrom, but also in the provision of the chromophoric compounds useful in such process.

As a chromophoric compound into which such fiber-reactive radical or radicals may be inserted in accordance with this invention there may be employed any known organic dyestuff. Such dyestuffs are generally of aromatic character in containing at least one carbocyclic or heterocyclic ring, and may generally be selected from among dyestuffs of the azo, quinoid (including anthraquinone, dibenzanthrone, other polycyclic ketones and substituted derivatives thereof), indigoid, thioindigoid, di- and tri-aryl (e.g. phenyl) methane, nitro, phthalocyanine, stilbene, and sulfur dyestuffs. Venkataraman's "Chemistry of Synthetic Dyes," Academic Press, New York, 1952, volumes I and II, discloses a multitude of such organic dyestuffs into which such fiber-reactive radicals of the formula shown above can be inserted in known manner. Further examples of dyestuffs into which the above defined fiber-reactive radicals may be inserted are also disclosed generically and specifically in, for example, U.S. Patents 2,657,205, 2,892,670, 2,892,671, 2,928,711, 2,940,812, 2,978,289, 3,029,123, 3,031,252, and 3,042,477, and such disclosures so far as they relate to chromophoric compounds or dyestuffs into which fiber-reactive groups may be inserted, are incorporated herein by reference thereto.

Optionally, the chromophoric compounds into which the above defined fiber-reactive radical or radicals are inserted may be colorless compounds containing groups enabling conversion to colored compounds or dyestuffs in situ on the fiber, as for example, a group promoting coupling with a diazotized primary aromatic amine or a diazotizable primary amine group whereby the color may be produced in situ on the fiber after reaction of the fiber-reactive radical-containing chromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxiding treatments and the like. It is to be understood that such colorless compounds are to be considered equivalent to the above described dyestuffs in carrying out the teachings of this invention.

The precursor for the fiber radical of Formula I is 5,5'-methylene-bis-barbituric acid, which can be obtained from barbituric acid and formaldehyde. However, in order to avoid the presence of unreacted barbituric acid, it is preferred to synthesize said precursor from methylene-dimalonic acid diethyl ester which can be obtained in pure state by vacuum distillation according to the procedure described by Knovenagel, Ber. 27, 2346. The diethyl ester is then reacted with urea to obtain the desired 5,5'-methylene-bis-barbituric acid by the known procedure as described for example by Grysling and Schwarzenbach, Helv. Chimica Acta 32, 1503. The reaction proceeds as follows:

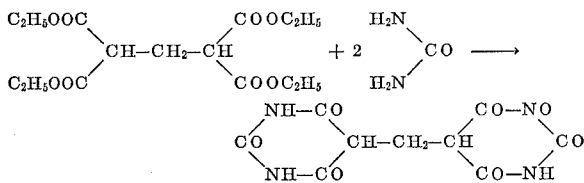

Enolization and conversion into 5,5'-methylene-bis (chloropyrimidines, or the corresponding bromopyrimidines, is readily effected by heating the 5,5'-methylene-bis-barbituric acid with phosphorus pentachloride or phosphorus pentabromide in requisite molar proportions to introduce 3 to 6 chlorine or bromine atoms into the two pyrimidine rings. Use of phosphorus pentachloride produces the following operative compounds:

II
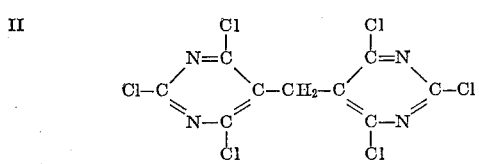

III
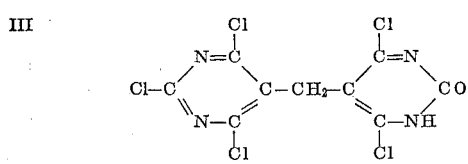

IV
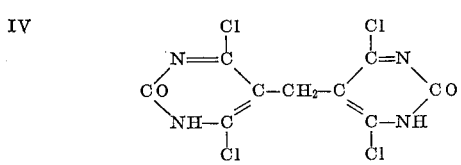

V
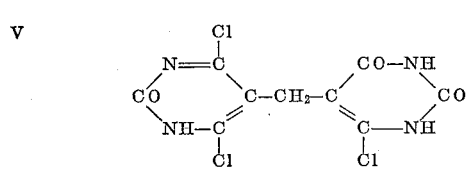

Bonding of the above described fiber-reactive radical of Formula I to an organic dyestuff or chromophoric compound may be conveniently carried out by reaction of one mole of a compound of Formulae II, III, IV or V with one or two moles of any of the above described organic dyestuffs or chromophoric compounds containing at least one free amino group, preferably in the presence of an acid binding agent. A molecule of the organic dyestuff or chromophoric compound is thus bound through an amino group NH to the fiber-reactive radical of Formula I at the free valence shown in the formula. If two moles of the dyestuff or chromophoric compound are employed per mole of compounds II to V, another molecule of the dyestuff or chromophoric compound will be bound to the fiber-reactive radical in the Y position of the $R^2$ moiety. It will thus be apparent that the fiber-reactive dyestuffs and chromophoric compounds thus produced will always contain at least one reactive chlorine or bromine atoms (X in the formula), and up to 5 such atoms, effective for reaction with a fiber containing a reactive hydrogen atom. The resulting colored fibers may be represented by the formula (VI)
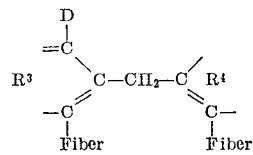

wherein D represents an organic dyestuff molecule, $R^3$ is selected from the group consisting of radicals of the formulae

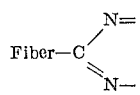

and

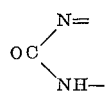

$R^4$ is selected from the group consisting of radicals of the formulae

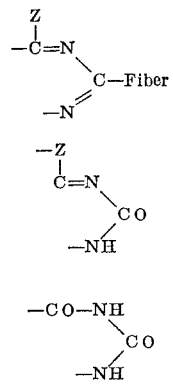

and

Z is selected from the group consisting of D and Fiber, and Fiber represents a reactive hydrogen-containing fiber molecule deprived of said reactive hydrogen atom.

By way of example, when the above described fiber-reactive radical is inserted into one mole of the reaction product of bromamine acid with p-phenylenediamine, D in the above Formula VI represents (VII)
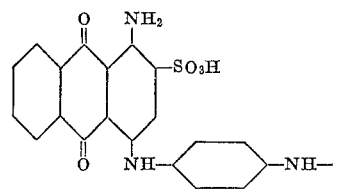

Similarly, insertion of the fiber-reactive radical into a mole of the reaction product of tri-chlorosulfonated copper phthalocyanine with sulfonated p-phenylenediamine followed by application of the resulting fiber-reactive dyestuff to such fibers yields a product of the above Formula VI wherein D represents VIII
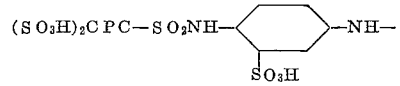

In its preferred embodiment, the fiber-reactive chromophoric compounds and dyestuffs of the present invention are water soluble (including ready dispersibility in water) to facilitate application thereof to the fiber from an aqueous medium. It is accordingly preferred that such chromophoric compounds and dyestuffs contain at least one ionogenic water solubilizing group preferably a sulfonic acid group although other such groups are known and may be employed as for example carboxylic, sulfato, sulfatoethoxy, phosphatoethoxy and the like. Such water solubilizing groups may be already present in the amino-containing chromophoric compound or dyestuff prior to insertion of the present fiber-reactive group therein, or such water solubilizing groups may be inserted subsequently and/or as a final step as by sulfonation in known manner, etc.

Optionally, since only one chlorine or bromine atom (X in Formula I) is necessary for fiber-reactivity, any remaining pyrimidine-bound chlorine and bromine atoms in the fiber-reactive dyestuffs and chromophoric compounds of the present invention may if desired be replaced by the same or different dyestuff moieties, water solubilizing groups, etc. It is preferred however to employ such dyestuffs and chromophoric compounds containing a chlorine or bromine atom in each pyrimidine ring ortho to the methylene linkage.

The fiber-reactive chromophoric compounds of the present invention are highly effective for coloring natural and synthetic fibers, preferably those containing an active H atom in the molecule, particularly cellulosic textile fibers, in any desired shades of good to excellent fastness and stability properties. The preferred coloring process involves dyeing (including printing) the fibrous materials by application thereto under acid-binding conditions of an aqueous medium containing a chromophoric compound of the invention (preferably water soluble) at any temperature ranging from ambient temperatures to the boiling point of the medium, said compound thereby reacting with the fiber with liberation of acid HX. The medium may have a pH ranging from about 4 to 14 although alkaline conditions are preferred. The medium may be applied in any desired manner, by continuous or batch methods and by immersion, roller application, padding, spraying, brushing, printing or the like. The aqueous medium is preferably a true or colloidal solution, but may also be in the form of a fine dispersion. It will accordingly be understood that the term "water soluble" as applied to the fiber-reactive chromophoric compounds herein is also intended to include ready water dispersibility, particularly since most such compounds and dyestuffs, though of high molecular weight and limited water solubility, are applied at relatively low concentrations to the fiber.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reactive chromophoric compound in a concentration ranging from about 0.5 to 10% or more.

It will be understood that the water in the above described aqueous medium may be replaced in whole or in part by a water miscible, polar organic solvent such as acetone, alcohol, dioxane, dimethylformamide, or the like without departing from the scope of this invention. It will likewise be understood that the medium containing the reactive chromophoric compounds described above may contain adjuvants commonly used in dyeing processes as for example solution aids such as urea and triodiglycol, migration inhibitors such as cellulose ethers, sodium chloride, sodium sulfate and other salts, wetting agents preferably of the nonionic surface active type as produced for example by polyoxyethylenation of such reactive hydrogen-containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive chromophoric compound and the fiber containing a reactive hydrogen atom involves liberation of acid HX and the reaction is accordingly forward by acid binding conditions. As acid binding agents which may be added to the medium containing the reactive chromophoric compound, there may be mentioned generally alkali metal (sodium potassium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% in the dispersion.

Instead of adding the acid binding agent to the medium containing the fiber-reactive chromophoric compound, said agent may be applied to the fiber prior to or subsequent to treatment with said medium, the important factor being the treatment of the fibers with the fiber-reactive chromophoric compound in the presence of the acid binding agent. Alternatively, instead of the acid binding agent, a substance may be employed which liberates an acid binding agent upon subsequent subjection to elevated temperatures. An example of such a substance is sodium trichloroacetate, and the use of such a substance requires subsequent application of elevated temperatures as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A dry heat treatment may be substituted by a steaming or the like if desired.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of this invention, such dyed or printed cellulose fibers are represented by Formula VI above wherein "Fiber" represents a cellulose molecule deprived of a reactive hydrogen atom as originally present for example in hydroxy groups therein. It will be apparent that cross-linking exists, with resultant increased fastness properties when the dyestuffs or chromophoric compounds as applied contain two or more pyrimidine-bound chlorine or bromine atoms X.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to those of the cellulose dyings described above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following example is only illustrative of the present invention and is not to be regarded as limitative. All parts and proportions referred to herein and in the appended claims are by weight unless otherwise indicated.

*Example*

Methylene-dimalonic acid diethyl ester is prepared and obtained in pure state by vacuum distillation as described by Knoevenagel, B., 27, 2346.

The reaction of the ester with urea to obtain 5,5'-methylene-bis-barbituric acid is performed according to Grysling and Schwarzenbach, Helv. Chimica Acta 32, 1503.

A container immersed in an oil bath is charged with 36 parts by weight phosphorus pentachloride and 7.7 parts by weight 5,5'-methylene-bis-barbituric acid. The products are thoroughly mixed and the temperature of the oil bath is raised to 130° C. When the inside temperature reaches 107° C. the mass has liquified. It is stirred at a bath temperature of 130° C. for 4 hours. Then the phosphorus chlorides ($POCl_3$, etc.) are removed by vacuum distillation. The remainder, consisting for the most part of 5,5'-methylene-bis(dichloropyrimidine) with smaller amounts of the corresponding tri-, penta- and hexa-chlorinated compounds, is worked into a slurry by stirring it with acetone in which it is partially soluble. This slurry is stirred at 10° C. into an aqueous solution of 11.5 parts of weight of a 36.2% past (=3 parts by weight 100%) of the dyestuff obtained by coupling diazotized 2-naphthylamine-4,8-disulfonic acid with meta-toluidine.

After stirring for 1 hour the pH is adjusted to 6.5 by means of soda ash. Agitation is contained at room temperature for ½ hour. Impurities are removed from the dyestuff solution by filtration. The dyestuff has the formula

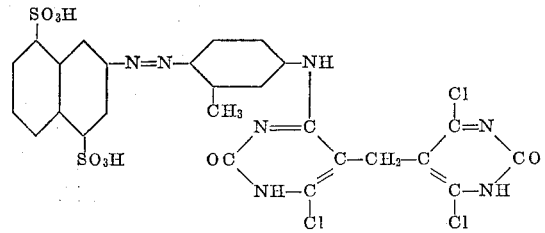

Heat-curing is not necessary in the application of the dyestuff to cotton. The dyeing is performed by heating cotton in a soda alkaline solution of the dyestuff at 90° C. After rinsing and washing in boiling detergent solution for 5 minutes the cotton is dyed washfast yellow.

This invention has been disclosed with respect to certain preferred embodiments and various modifications and variations thereof will become obvious to the person skilled in the art. It is to be understood that such modifications and variations are to be included within the spirit and scope of this invention.

We claim:
1. An organic water soluble dyestuff selected from the group consisting of those of the formulae

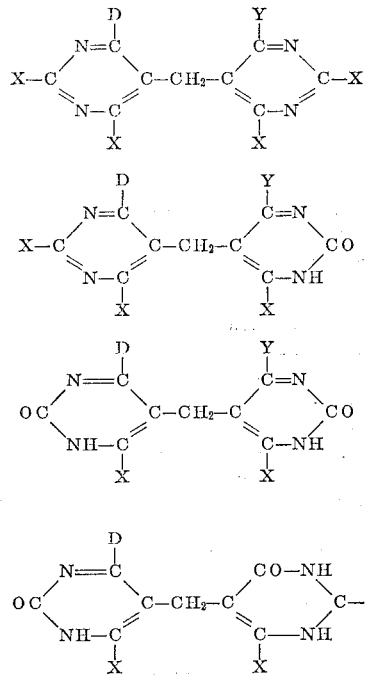

and wherein
X is selected from the group consisting of Cl and Br,
Y is selected from the group consisting of X and D,
and
D is a water soluble dyestuff moiety selected from the group consisting of azo, anthraquinone and phthalocyanine radicals containing a nuclearly substituted amino group through which it is joined to the depicted remainder of the molecule of said dyestuff.

2. A dyestuff as defined in claim 1 wherein Y and X are Cl.
3. An azo dyestuff as defined in claim 1.
4. An anthraquinone dyestuff as defined in claim 1.
5. A phthalocyanine dyestuff as defined in claim 1.
6. A dyestuff having the formula

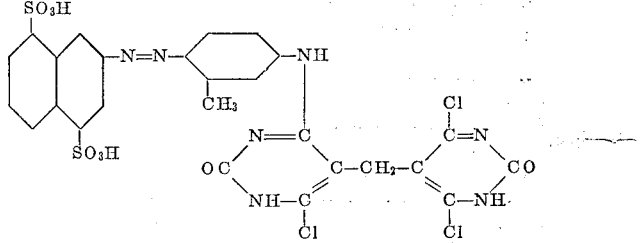

References Cited by the Examiner
UNITED STATES PATENTS

| | | | |
|---|---|---|---|
| 1,886,480 | 11/1932 | Haller et al. | 8—54.2 X |
| 2,332,047 | 10/1943 | Bock et al. | 8—124 X |
| 2,339,739 | 1/1944 | Blackshaw et al. | 8—54.2 |
| 2,350,188 | 5/1944 | Pinkney | 8—54.2 |
| 2,746,951 | 5/1956 | Taube | 260—154 |

CHARLES B. PARKER, *Primary Examiner.*

NORMAN G. TORCHIN, *Examiner.*